UNITED STATES PATENT OFFICE.

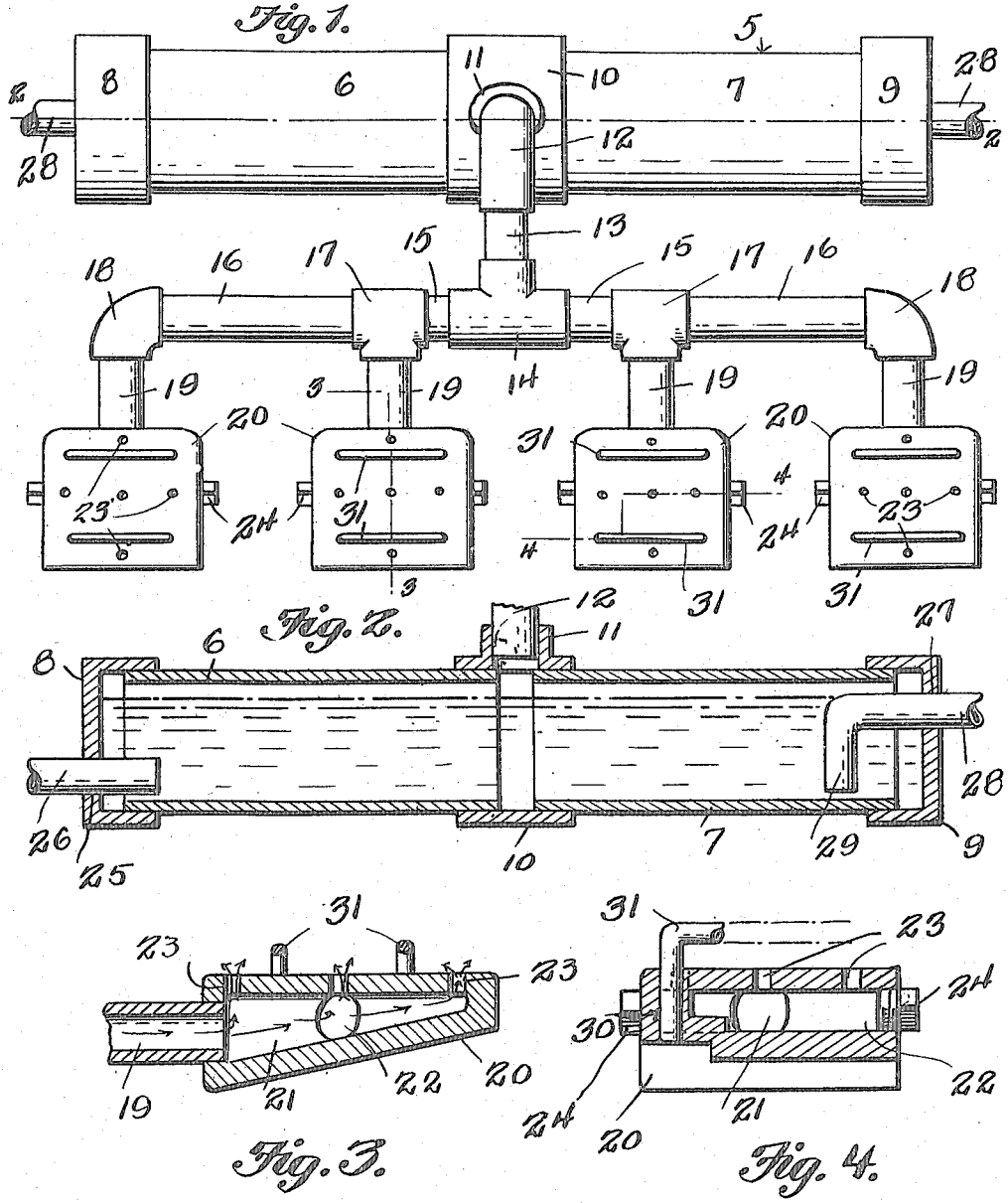

JOSEPH W. GORE, OF CAPE GIRARDEAU, MISSOURI.

STEAMING APPARATUS FOR VAMPS.

1,135,450.  Specification of Letters Patent.  Patented Apr. 13, 1915.

Application filed January 27, 1914.  Serial No. 814,742.

*To all whom it may concern:*

Be it known that I, JOSEPH W. GORE, a citizen of the United States, residing at Cape Girardeau, in the county of Cape Girardeau and State of Missouri, have invented certain new and useful Improvements in Steaming Apparatus for Vamps, of which the following is a specification.

This invention relates to new and useful improvements in steamers for vamps and is adapted for use especially in connection with the manufacture of shoes, but it is to be understood that I am not to be entirely limited to such use alone, but may employ the same for any other use to which the various parts will adapt themselves.

The primary object of this invention is the provision of a device such as described, by means of which the vamps and vamp linings of shoes can be steamed and softened before being applied to the last, whereby when pulled over the last, they will be prevented from being torn.

A further object of this invention, is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts, to be hereinafter more fully described, claimed and illustrated in the accompanying drawing in which:

Figure 1 is a top plan view of my invention. Fig. 2 is a longitudinal sectional view thereof, taken on the line 2—2 of Fig. 1. Fig. 3 is a transverse sectional view taken on the line 3—3 of Fig. 2. Fig. 4 is a similar view taken on the line 4—4 of Fig. 2.

Referring to the accompanying drawings by similar characters of reference throughout the several views, the numeral 5 denotes in general my improved steamer, consisting of a tank formed from a pair of cylindrical members 6 and 7, closed at their outer ends by caps 8 and 9 and connected at their inner ends by a threaded coupling 10. This coupling 10 is provided with a threaded nipple 11, which engages and supports an elbow 12 to which is connected a pipe 13. A T coupling 14 is connected to the pipe 13 and supports at right angles to the same a pair of pipes 15 which extend parallel to and in spaced relation from the tank. T couplings 17 are connected to the pipes 15 and support in alinement therewith similar pipes 16, while connected to the ends of these pipes 16, are elbows 18.

Supporting pipes 19 are connected to the elbows 18 and T couplings 17. These pipes extend at right angles to the adjacent side of the tank, in relative parallel relationship, and are spaced an equal distance apart. These pipes 19 support the steamers 20, which are of a substantially rectangular formation each having a longitudinal bore 21 and a transverse bore 22, which communicate with the exterior of the steamer through the ports 23. The transverse bores 22 are closed by the treaded plugs 24.

The cap 8 is formed with an opening 25 arranged on its vertical axis adjacent the lower edge thereof, through which extends an inlet pipe 26. A similar opening 27 is formed in the cap 9 near its upper edge to receive the outlet pipe 28, the inner end of which is extended downwardly as at 29 to a point adjacent the lower side of the tank.

The steamers 20 are each provided adjacent their outer edges with vertical openings 30, in which are slidably located the adjustable supporting rods 31, on which the vamps rest while being steamed. This construction makes it possible to regulate the intensity of the heated steam by increasing or decreasing the distance between the vamp and the steamer 20. If desired the steam can be controlled by valves (not shown in the drawing) which can be applied to either or both of the pipes 26 and 28 or the pipe 19.

In use the steamer is placed in a convenient position and can be incased by suitable insulating material if desired. The vamps are then placed upon the steamers 20, resting upon the rods 31, which have been adjusted to the desired position. The steam is then allowed to flow through the ports 23 to engage the vamps, which are allowed to remain in this position until sufficiently steamed to prevent their tearing when applied to the last.

It should be understood in this connection, that various minor changes in the specific details of construction can be resorted to within the scope of the appended claims without departing from or sacrificing any of the advantages of the invention.

From the foregoing disclosures taken in connection with the accompanying drawings it will be manifest that a steamer for vamps is provided which will fulfil all the necessary requirements of such a device.

Having thus fully described this invention, what I claim as new and desire to protect by Letters Patent is:

1. In an apparatus such as described, a tank, said tank having openings formed in the opposite edges thereof, pipes disposed within these openings, one pipe having its end bent toward one side of the tank and terminating therein, and a plurality of steamers in communication with the tank.

2. In a device such as described, a tank, a plurality of steamers in communication with the tank, said steamers having ports in one side thereof, said steamers having bores therein in communication with the exterior of the steamers through the ports, and adjustable supporting means upon the steamers.

3. In a device such as described, a plurality of steamers, means for supplying steam thereto, said steamers each having openings therein, and a plurality of U-shaped supporting rods adjustable within the openings.

4. In an apparatus of the class described, in combination, a tank, said tank having openings therein in its opposite ends, the openings being arranged one near the lower side of the tank and the other near the opposite side of the tank, pipes within these openings, one pipe being bent toward the opposite side of the tank, a plurality of steamers in communication with the tank, said steamers each having a longitudinal and transverse bore, said steamers being further provided with ports in communication with the bores, plugs closing certain of the bores, the said steamers having openings located therein, and supporting rods adjustable in said openings.

In testimony whereof I affix my signature in presence of two witnesses.

JOSEPH W. GORE.

Witnesses:
  C. F. Cox,
  L. F. Smith.